(12) United States Patent
Phillips

(10) Patent No.: US 12,029,938 B2
(45) Date of Patent: Jul. 9, 2024

(54) BI-DIRECTIONAL FOOT PEDAL FOR CONTROLLING MOVEMENT, MEASUREMENTS, AND INFORMATION

(71) Applicant: Alexander Smedes Phillips, Goshen, NY (US)

(72) Inventor: Alexander Smedes Phillips, Goshen, NY (US)

(*) Notice: Subject to any disclaimer, the term of this patent is extended or adjusted under 35 U.S.C. 154(b) by 202 days.

(21) Appl. No.: 16/680,010

(22) Filed: Nov. 11, 2019

(65) Prior Publication Data
US 2021/0138297 A1    May 13, 2021

(51) Int. Cl.
| | | |
|---|---|---|
| *A63B 22/02* | (2006.01) | |
| *A63B 21/00* | (2006.01) | |
| *A63B 24/00* | (2006.01) | |
| *A63B 71/06* | (2006.01) | |
| *B62M 6/30* | (2010.01) | |
| *G05G 1/30* | (2008.04) | |
| *G10H 1/34* | (2006.01) | |

(52) U.S. Cl.
CPC .......... *A63B 22/02* (2013.01); *A63B 21/4035* (2015.10); *A63B 24/0087* (2013.01); *A63B 71/0622* (2013.01); *B62M 6/30* (2013.01); *G05G 1/30* (2013.01); *G10H 1/348* (2013.01); *A63B 2225/20* (2013.01); *A63B 2225/50* (2013.01)

(58) Field of Classification Search
CPC . A63B 22/02; A63B 21/4035; A63B 24/0087; A63B 71/0622; A63B 2225/20; A63B 2225/50; B62M 6/30; G05G 1/30; G10H 1/348
See application file for complete search history.

(56) References Cited

U.S. PATENT DOCUMENTS

| | | | | |
|---|---|---|---|---|
| 5,755,651 A | * | 5/1998 | Homyonfer | ............ A63B 22/16 |
| | | | | 482/123 |
| 10,434,357 B2 | * | 10/2019 | McCarthy | .......... A63B 21/0552 |
| 2018/0053494 A1 | * | 2/2018 | Pagliere | ................. G10H 3/125 |

* cited by examiner

*Primary Examiner* — Jianchun Qin

(57) ABSTRACT

A system and method for controlling various types of messages, including a MIDI signal of a MIDI instrument, bi-directionally with a center detent and a resting plate for a user's foot is disclosed. A foot pedal system has a base, a pedal, a sensing mechanism, a foot rest bar, a MIDI pedal controller, a MIDI-In port for receiving the first MIDI signal from the MIDI instrument, and a MIDI-Out port for outputting the second MIDI signal. The pedal has a center detent and a spring mechanism for returning the pedal to a default position.

5 Claims, 7 Drawing Sheets

Note 3: McMaster Carr
Grade 1045, 1/4" Rod Unpolished
Yeild Strength 77,000 PSI, Hardness Medium, ASTM A108
P/N 8924K93

Note 4: McMaster Carr
UHMW Bearing, Flanged, for 1/4" Shaft Diameter, 3/8"ODX3/8"L.
P/N 57785K107
2 Required Note 5: McMaster Carr
Set Screw Shaft Collar, for 1/4" Diameter, Zinc-Plated Steel
P/N 6432K12
2 Required

BI-DIRECTIONAL FOOT PEDAL FOR CONTROLLING MOVEMENT, MEASUREMENTS, AND INFORMATION

BACKGROUND OF THE INVENTION

Field of the Invention

The present invention generally relates to a system, apparatus, method, and program for controlling various types of messages bi-directionally with a center detent and a resting plate for a user's foot. In particular, the present invention relates to using a foot pedal to control a MIDI signal of a MIDI instrument to create electric guitar sound effects and the like.

Description of the Prior Art

Controlling sounds has been attempted by the music industry for a long time. For example, since the introduction of Musical Instrument Digital Interface (MIDI), creating a variety of sounds of different instruments with a MIDI instrument, such as a digital keyboard, has become convenient. Typically, a digital keyboard can produce the sound of a piano, drums, an electric guitar, and other sounds and instruments, and can control parameters such as volume, vibrato, and pitch.

One example of a conventional approach to creating, for example, the sound of an electric guitar with a keyboard is creating the sounds that an electric guitar would normally produce, when a user plays a key on the keyboard. For example, a keyboard user who wishes to imitate the sound of a heavy metal guitar could use a distortion guitar sound, and then set the aftertouch feature to apply a pitch bend to the note. A pitch bend wheel or mod wheel of a digital keyboard can create sound effects similar to those of an electric guitar.

However, one drawback to this method is that imitating electric guitar sounds with the pitch or mod wheel requires the user to use one hand to play a key and the other hand to control the pitch or mod wheel.

Using a foot controller to provide a keyboard user with means to control the pitch of a sound generated by the keyboard, or for example, to imitate electric guitar sounds, would have drawbacks. For example, it is inconvenient for the user to find a default location of the pedal and to rest his or her foot while using the foot controller.

Accordingly, there has been a need for an improved technique for controlling various types of messages, including MIDI messages, bi-directionally with a resting plate for the user's foot.

SUMMARY OF THE INVENTION

The foregoing and other problems can be overcome by an improved method for controlling various types of messages, including a MIDI message of a MIDI Instrument, with a foot pedal system, and also by a system, apparatus, and program that operate in accordance with the method.

According to an example aspect of the invention, a system for controlling an Instrument with a foot pedal comprises:
(a) a MIDI instrument, the MIDI instrument generating a first MIDI signal; and
(b) a foot pedal system, the foot pedal system comprising:
  (i) a base,
  (ii) a pedal, the pedal comprising a center detent and a spring mechanism for returning the pedal to a default position, wherein the pedal is pivotally connected to a pivot point of the base such that the pedal is pivotable up and down about the pivot point by a user's foot,
  (iii) a sensing mechanism, wherein the sensing mechanism senses a position of the pedal between a first position and a second position,
  (iv) a foot rest bar or unit, wherein the foot rest bar is located on a top side of a center of the pedal, allowing the user's foot to rest on the foot rest bar without pivoting the pedal,
  (v) a MIDI-In port for receiving the first MIDI signal from the MIDI instrument,
  (vi) a MIDI pedal controller, wherein the MIDI pedal controller generates a second MIDI signal based on the pitch of the first MIDI signal with reference to the position of the pedal between the first position and the second position, and
  (vii) a MIDI-Out port for outputting the second MIDI signal.

According to another embodiment, the foot pedal system further comprises a switch for choosing which MIDI channel is used by the MIDI instrument.

According to another example aspect of the invention, a method for controlling an instrument with a foot pedal system having a foot pedal, comprises the steps of:
(a) generating, by a MIDI instrument, a first MIDI signal;
(b) generating, by the foot pedal system, a pedal signal with reference to a position of the foot pedal;
(c) sending the first MIDI signal and the pedal signal to a MIDI pedal controller; and
(d) generating, by the MIDI pedal controller, a second MIDI signal by modulating the first MIDI signal based on the pedal signal.

In another embodiment, the method for controlling an instrument with a foot pedal system having a foot pedal further comprises applying a spring force to the pedal such that the pedal returns to a default position when not being used.

According to another example aspect of the invention, an apparatus for controlling an instrument with a foot pedal system, comprises:
(a) an instrument that generates a first signal;
(b) a foot pedal system that receives the first signal and generates a pedal signal with reference to a position of the foot pedal;
(c) a transmitter that transmits the first signal and the pedal signal; and
(d) a pedal controller that receives the first signal and the pedal signal and generates a second signal by modulating the first signal based on the pedal signal.

According to another example aspect of the invention, a method for controlling an instrument with a foot pedal system having a foot pedal comprises the steps of: (a) receiving a first MIDI signal generated by a MIDI instrument; (b) generating a pedal signal with reference to a position of the foot pedal; and (c) generating a second MIDI signal by modulating the first MIDI signal based on the pedal signal. The position of the foot pedal may be determined by a sensing mechanism, which may include one or more potentiometers.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The term "MIDI" as used herein is an acronym that stands for Musical Instrument Digital Interface, which is a technical standard that describes a communications protocol, digital interface, and electrical connectors that connect a wide variety of electronic musical instruments, computers, and related audio devices for playing, editing, and recording music. It is noted that the foot pedal disclosed herein can be used to control signals, including MIDI signals or others.

Figure 1:
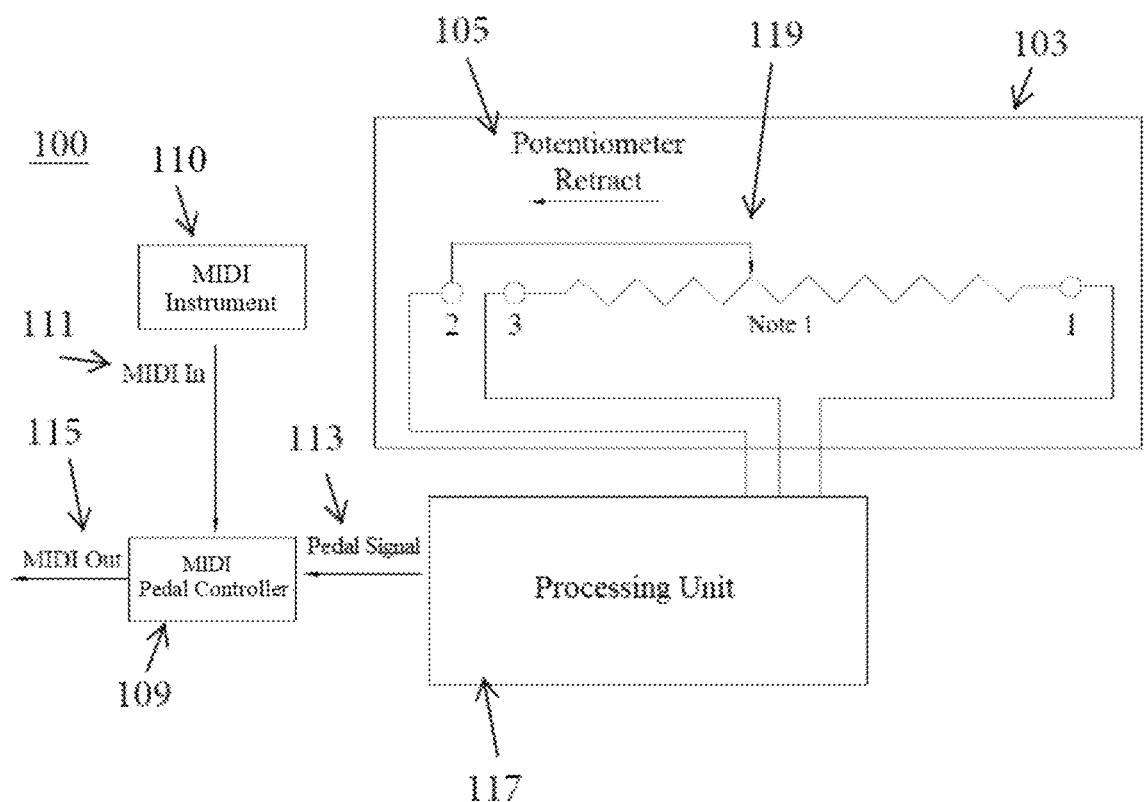
FIG. 1 is a schematic diagram of one embodiment of the invention.

Referring to FIG. 1, there is seen a schematic diagram of one embodiment of the invention. A foot pedal system 100 comprises a pedal 103. The pedal 103 is pivotably connected to a pivot point of a base. The pedal 103 is associated with at least one potentiometer 105 such that when the pedal 103 pivots about the pivot point, a sliding contact 119 of the at least one potentiometer 105 retracts or advances depending on a direction and a degree of the pivot of the pedal 103. A processing unit 117 can generate pedal signals 113 with reference to a position of the pedal 103 based on the at least one potentiometer 105. The pedal signal 113 can be an analog or digital signal. The at least one potentiometer 105 may be a linear motion potentiometer. In one embodiment, the at least one potentiometer 105 can be connected to at least one three-pole socket via at least one stereo jack and cable. In another embodiment, the at least one potentiometer 105 is connected to the processing unit 117 without using the at least one stereo jack, as shown in FIG. 1. MIDI-In signals 111 sent from a MIDI instrument 110 and the pedal signals 113 generated by the processing unit 117 from the pedal 103 are sent to a MIDI pedal controller 109. The MIDI pedal controller 109 generates MIDI-Out or control signals 115 by modifying the MIDI-In signals 111 based on the pedal signals 113. For example, the MIDI pedal controller 109 changes a pitch of the MIDI-In signals 111 based on the pedal signals 113, or does not change the pitch if the pedal 103 does not change position. Of course, parameters other than the pitch can be changed as well, such as reverberation, volume, sound, etc. The processing unit 117 and/or the MIDI pedal controller 109 can comprise an analog-to-digital converter (ADC) that converts analog signals to digital signals. The MIDI pedal controller 109 can be disposed within the base connected to the pedal 103 or in a separate housing.

Figure 2:
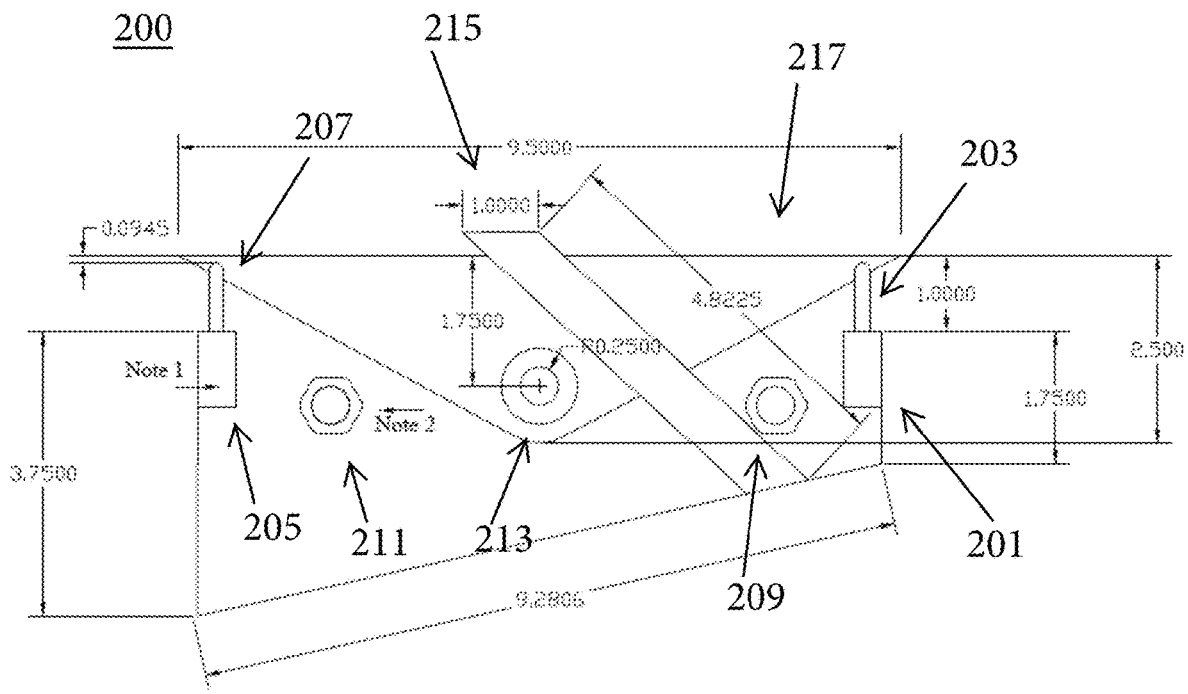
FIG. 2 is a schematic side view of an exemplary foot pedal system of one embodiment of the invention.

Referring to FIG. 2, there is seen a schematic side view of an exemplary foot pedal system 200 of one embodiment of the invention. The foot pedal system 200 comprises a first potentiometer 201, a second potentiometer 205, a pedal 217, a foot rest bar 215, a first three-pole socket 209, a second three-pole socket 211, and a pivot point 213. The first potentiometer 201 is disposed under a front side of the pedal 217. The second potentiometer 205 is disposed under a rear side of the pedal 217. Each of the potentiometers 201, 205 comprises a shaft 203, 207, respectively. The pedal 217 is pivotably connected to the pivot point 213.

When the pedal 217 is pressed in either direction, the pedal 217 creates a signal impedance ranging from approximately 10-10K Ohms, for example. This signal is carried by a wire or cable in this example embodiment to the ¼" stereo jack, i.e., three pole socket 211. For example, the linear potentiometers 201, 205 may have an impedance ranging from 0 Ohms to 10K Ohms. As a potentiometer 201, 205 is pressed or released, the impedance changes and the signal is carried to the ¼" stereo jack, i.e., three pole socket 211. The socket 211 is used in one embodiment to connect the pedal 217 to the signal converter or a processor via for example a ¼" male connector and cable, or a wireless connection. It is noted that the pedal 217 and the signal converter or the processor can be connected via a wired or wireless connection. The signal converter or the processor can be disposed in a processing unit 117 or a MIDI Pedal Controller 109.

In another embodiment, the foot pedal system 200 comprises a pedal 217, at least one potentiometer, and a foot rest bar 215, and can be used with an analog musical instrument.

The converter changes the signal to an event message, in this case a pitch bend signal that the MIDI software can translate. In one example embodiment, the converter comprises MC68HC705P6A EPROM, Texas Instruments CMOS CD4013B, Texas Instruments CMOS CD4015B, Texas Instruments SN54HC373, SN74HC373, SN54HC393, SN74HC393 Binary Counters, 93AA46A/B/C, 93LC46A/B/C, and/or 93C46A/B/C 1K Microwire Compatible Serial EEPROM. It is noted that the above-mentioned elements are not a complete list of all of the components.

Still referring to FIG. 2, when the pedal 217 pivots about the pivot point 213 against the shaft 203 of the first potentiometer 201, the resistance of the first potentiometer 201 changes. Similarly, when the pedal 217 pivots about the pivot point 213 against the shaft 207 of the second potentiometer 205, a resistance of the second potentiometer 205 changes. The pedal signals 113 are generated by the processing unit 117 based on the resistance of the first potentiometer 201 and/or the resistance of the second potentiometer 205. The pedal signals 113 are sent from a processing unit 117 to the MIDI pedal controller 109.

Figure 3:
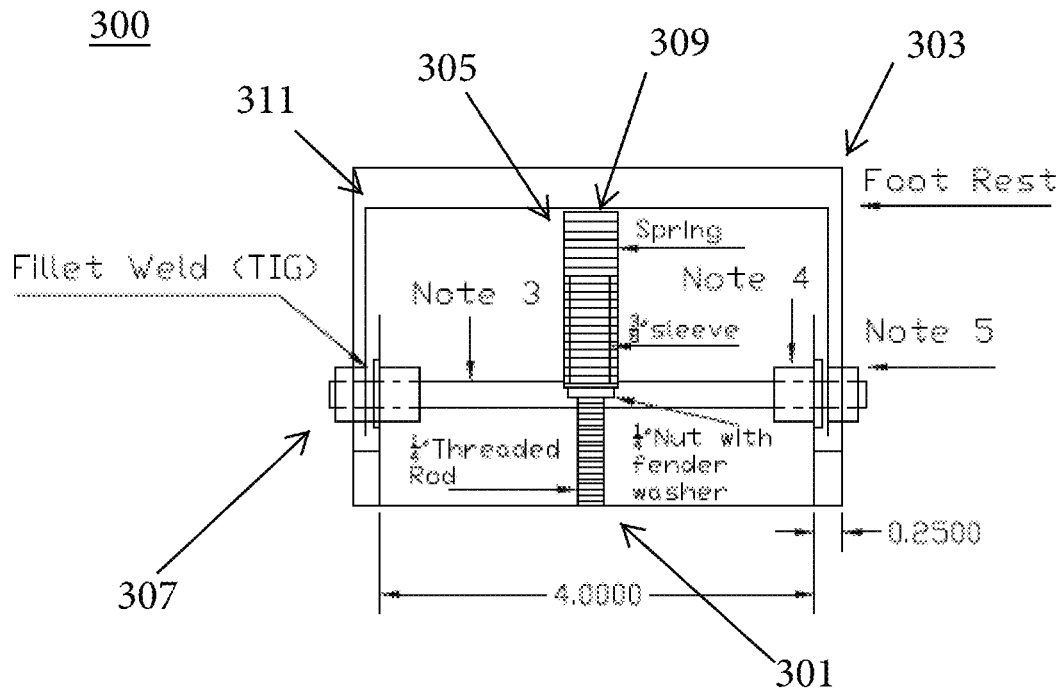
FIG. 3 is a schematic front view of an exemplary foot pedal system of one embodiment of the invention.
Figure 4:
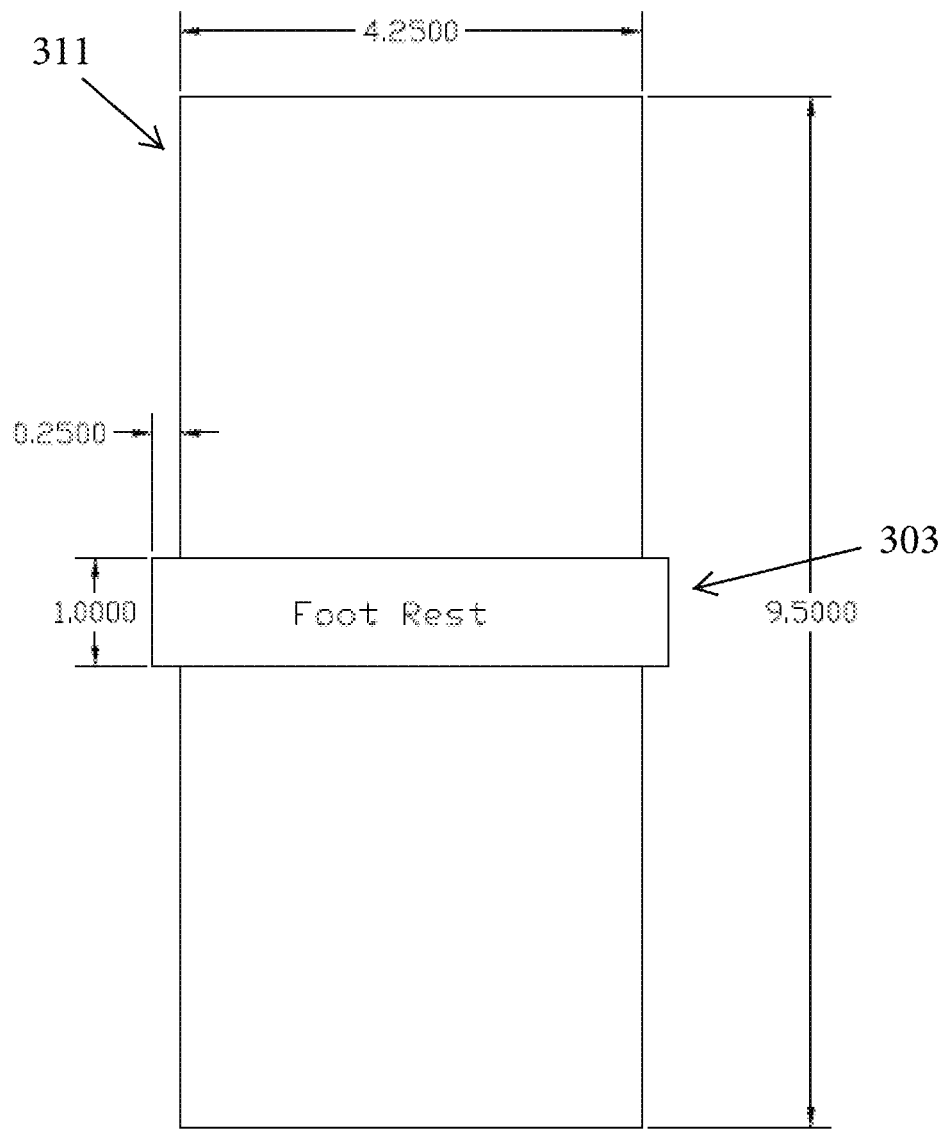
FIG. 4 is a schematic top view of an exemplary foot pedal system of one embodiment of the invention.

Referring to FIGS. 3-4, there are seen a schematic front view and a schematic top view of an exemplary foot pedal system 300 of another embodiment of the invention, respectively. The foot pedal system 300 comprises a threaded rod 301, a foot rest bar 303, a spring 305, a pivot point 307, a potentiometer 309, and a pedal 311. The spring 305 may be in a cylinder shape, or others. The spring 305 surrounds and covers the potentiometer 309. The spring 305 is configured to apply a spring force against a bottom surface of a front side or a rear side of the pedal 311. The spring force returns or attempts to return the pedal 311 to its default position. The foot rest bar 303 is disposed around a center of the pedal 311. The pedal 311 is pivotably connected to the pivot point 307. When the pedal 311 pivots about the pivot point 307 against the front side or the rear side of the foot pedal system 300, the foot pedal system 300 via the potentiometer and a processor such as the processing unit 117 generates or modifies pedal signals 113 with reference to the position of the pedal 311.

In a preferred embodiment, as shown in FIG. 4, the length and the width of the pedal 311 may be 9.5 inches and 4.25 inches, respectively; and the length and the width of the foot rest bar 303 may be 1 inch and 4.75 inches, respectively. However, embodiments are of course not limited to these dimensions and other suitable dimensions can be used.

Figure 5:
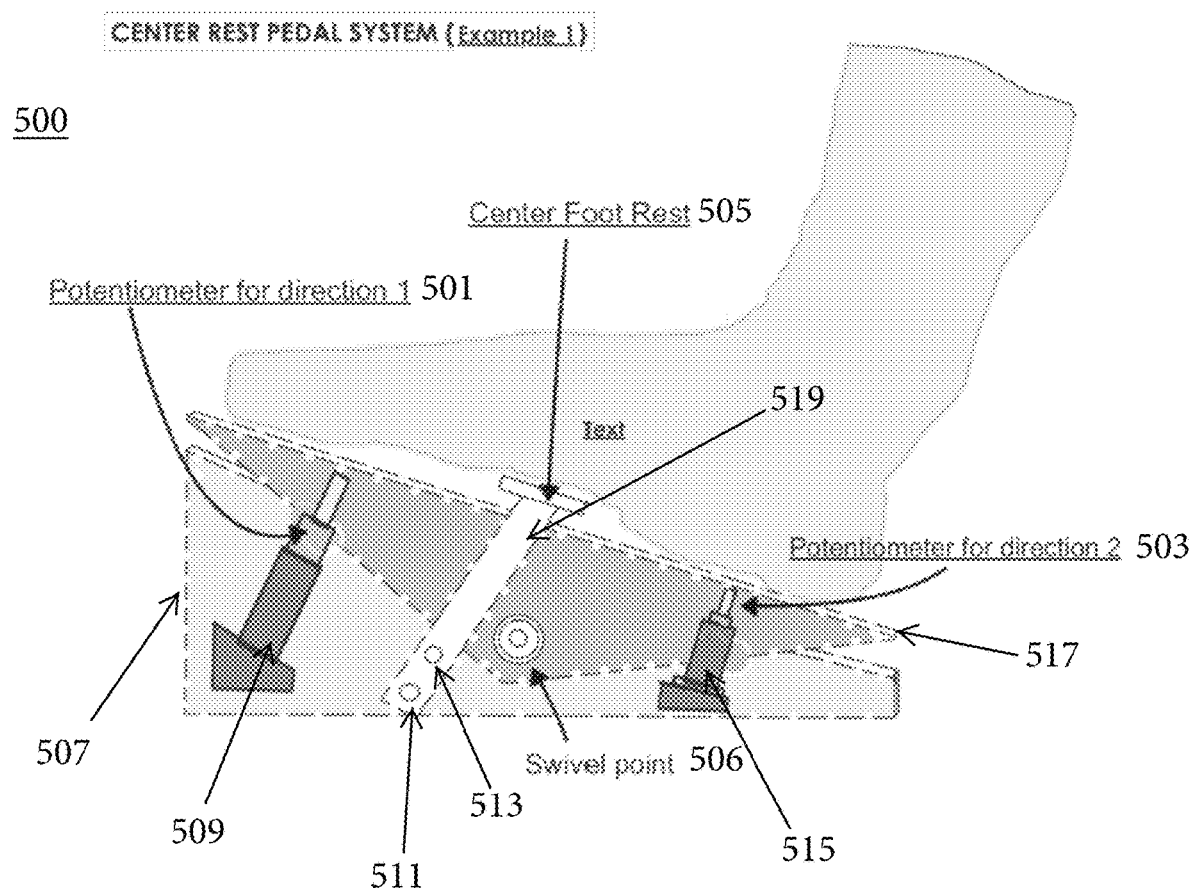
FIG. 5 is a sectional side view of an exemplary foot pedal system of one embodiment of the invention.

Referring to FIG. 5, there is seen a sectional side view of an exemplary foot pedal system 500 of another embodiment of the invention. A first potentiometer 501 is disposed near a front side of a pedal 517 on a top side of a first inner support 509, and a second potentiometer 503 is disposed near a rear side of the pedal 517 on a top side of a second inner support 515. The foot pedal system 500 comprises a base 507. The base 507 has a top surface that is tilted at an angle such that a user sitting at a chair can comfortably place his or her foot on the top surface of the foot pedal system 500 that is disposed in front of the chair. The pedal 517 is pivotably connected to a pivot point 506 on each side of the base such that the pedal 517 can pivot in response to forces applied by a front side of the foot of the user or a rear side of the foot of the user. The foot rest bar 505 is securely connected to side supports 519, each of which is connected to the base 507 via, for example, a first connection point 511 and a second connection point 513 of a first side of the base 507 and a first connection point (not shown) and a second connection point (not shown) of a second side of the base 507, wherein the first side and the second side are tangential to a front side and a rear side of the base 507 and are opposed to each other. The foot rest bar 505 is disposed near a center of the pedal 517 and is higher than the pedal 517 such that the user can place the middle portion of the bottom of his or her foot and rest his or her foot without pivoting the pedal 517.

The signals from the potentiometers 501, 503 are sent to a processing unit 117 which generates the pedal signals 113. The foot pedal system 500 can be used to increase or decrease pitch, volume, and/or settings in equalization. The center foot rest 505 is a resting bar on which the user's foot sits while in a default or neutral position.

Figure 6:
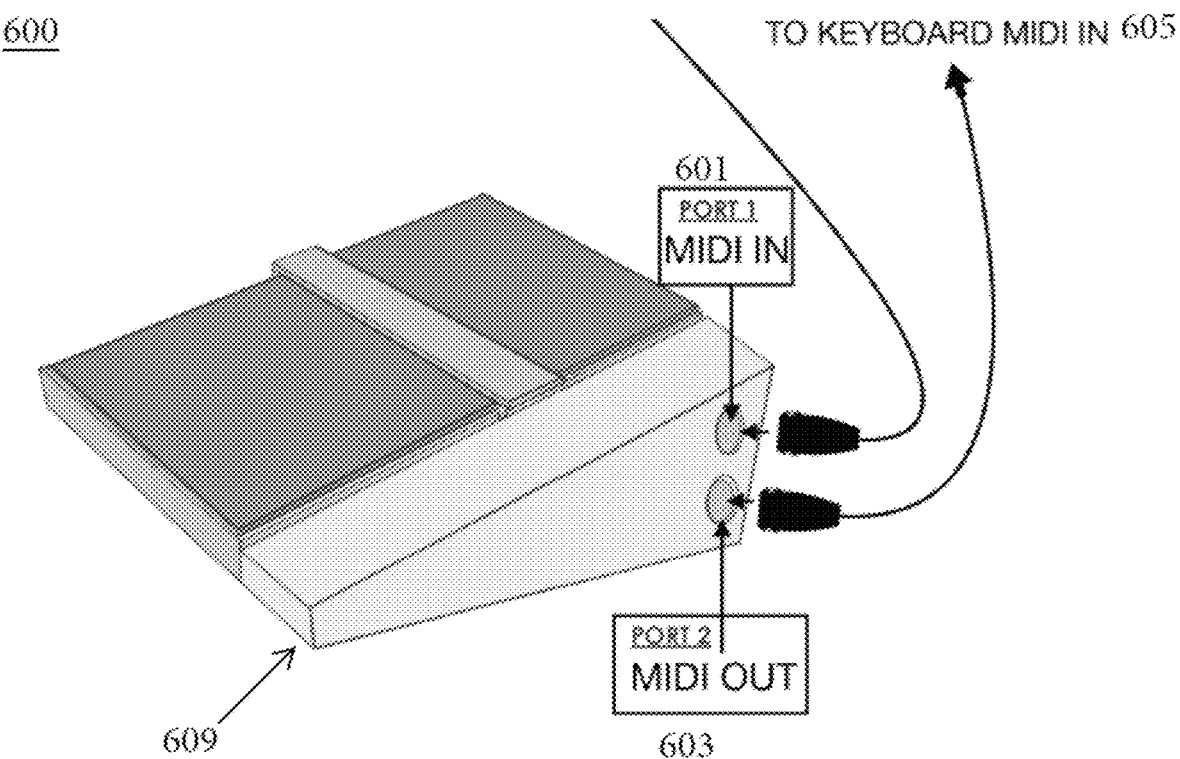
FIG. 6 is a perspective view of an exemplary foot pedal system of one embodiment of the invention.

Referring to FIG. 6, there is seen a perspective view of an exemplary foot pedal system 600 of one embodiment of the invention. The foot pedal system 600 comprises a MIDI-In port 601 and a MIDI-Out port 603 on one side of a base 609. The MIDI-In port 601 of the foot pedal system 600 can communicate with the MIDI-Out port 607 of another MIDI instrument, such as a MIDI keyboard. The MIDI-Out port 603 of the foot pedal system 600 can communicate with the MIDI-In port 605 of the another MIDI instrument.

Figure 7:
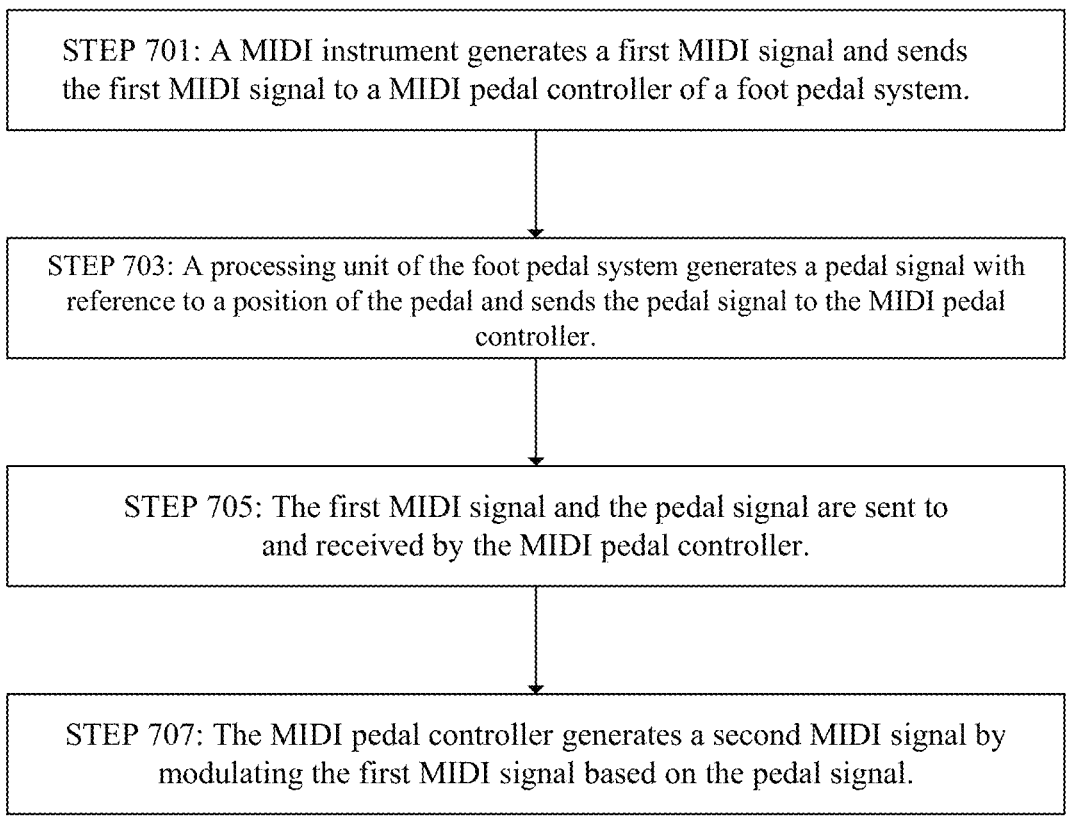
FIG. 7 is a flowchart of an exemplary process for the foot pedal system of one embodiment of the invention.

Referring to FIG. 7, there is seen an exemplary process for the foot pedal system of embodiments of the invention as described above (e.g., 100, 200, 300, 500, 600). In step 701, a MIDI instrument 110 generates a first MIDI signal (e.g., 111) and sends the first MIDI signal 111 to a MIDI pedal controller (e.g., MIDI pedal controller 109) of the foot pedal system. In step 703, a processing unit (e.g., processing unit 117) of the foot pedal system generates a pedal signal (e.g., 113) with reference to a position of the pedal and sends the pedal signal 113 to the MIDI pedal controller 109. In step 705, the first MIDI signal 111 and the pedal signal 113 are received by the MIDI pedal controller 109. In step 707, the MIDI pedal controller 109 generates a second MIDI signal (e.g., 115) by modulating the first MIDI signal 111 based on the pedal signal 113. (A spring force may be applied to the pedal by the user such that the pedal returns to a default position.) It is noted that steps 701 and 703 can be performed in any order.

In one embodiment, the foot pedal system can be powered by, e.g., a battery or an adapter. For example, the foot pedal can have a compartment to hold one or more batteries in the bottom of the base 507 and/or have a connector for a power supply on a side of the base 507. Preferably, the foot pedal system can be powered by a 9-volt battery, an AD adapter such as the Dunlop ECB003/ECB003E, or a DC Brick® power supply, but of course the invention is not limited to this.

Software embodiments of the present invention may be provided as a computer program product, or software, that may include an article of manufacture on a machine accessible or machine readable medium (memory) having instructions. The instructions on the machine accessible or machine readable medium may be used to program a computer system or other electronic device. The machine-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system for controlling an Instrument with a foot pedal, comprising: (a) a MIDI Instrument, the MIDI instrument generating a first MIDI signal; and (b) a foot pedal system, the foot pedal system comprising: (i) a base, (ii) a pedal, the pedal comprising a center detent and a spring mechanism for returning the pedal to a default position, wherein the pedal is pivotally connected to a pivot point of the base such that the pedal is pivotable up and down about the pivot point by a user's foot, (iii) a sensing mechanism, wherein the sensing mechanism senses a position of the pedal between a first position and a second position, (iv) a foot rest bar, wherein the foot rest bar is located on a top side of a center of the pedal, allowing the user's foot to rest on the foot rest bar without pivoting the pedal, (v) a MIDI-In port for receiving the first MIDI signal from the MIDI instrument, (vi) a MIDI pedal controller, wherein the MIDI pedal controller generates a second MIDI signal based on the pitch of the first MIDI signal with reference to the position of the pedal between the first position and the second position, and (vii) a MIDI-Out port for outputting the second MIDI signal.

2. The system of claim 1, wherein the foot pedal system further comprises a switch for choosing which MIDI channel is used by the MIDI Instrument.

3. A foot pedal apparatus, comprising: (a) a base, (b) a pedal, the pedal comprising a center detent and a spring mechanism for returning the pedal to a default position, wherein the pedal is pivotally connected to a pivot point of the base such that the pedal is pivotable up and down about the pivot point by a users foot, (c) a sensing mechanism, wherein the sensing mechanism senses a position of the pedal between a first position and a second position, (d) a foot rest bar, wherein the foot rest bar is located on a top side of a center of the pedal, allowing the user's foot to rest on the foot rest bar without pivoting the pedal, and (a) a MIDI pedal controller, wherein the MIDI pedal controller receives a first MIDI signal from a MIDI instrument and generates a second MIDI signal based on the pitch of the first MIDI signal with reference to the position of the pedal between the first position and the second position.

4. The apparatus of claim 3, wherein the MIDI pedal controller comprises: (f) a MIDI-In port for receiving the first MIDI signal from the MIDI instrument, and (g) a MIDI-Out port for outputting the second MIDI signal.

5. The apparatus of claim 4, wherein the sensing mechanism comprises at least one potentiometer that determines the position of the pedal between the first position and the second position and that generates a signal that indicates the position of the pedal between the first position and the second position.

\* \* \* \* \*